(12) United States Patent
Yu et al.

(10) Patent No.: US 7,099,389 B1
(45) Date of Patent: Aug. 29, 2006

(54) RATE CONTROL WITH PICTURE-BASED LOOKAHEAD WINDOW

(75) Inventors: Guoyao Yu, Portland, OR (US); Zhi Zhou, Seattle, WA (US); Charles H. Van Dusen, Beaverton, OR (US)

(73) Assignee: Tut Systems, Inc., Lake Oswego, OR (US)

( * ) Notice: Subject to any disclaimer, the term of this patent is extended or adjusted under 35 U.S.C. 154(b) by 800 days.

(21) Appl. No.: 10/316,483

(22) Filed: Dec. 10, 2002

(51) Int. Cl.
*H04N 7/12* (2006.01)
*H04N 11/02* (2006.01)

(52) U.S. Cl. .......................... 375/240.12; 375/240.06; 375/240.25

(58) Field of Classification Search ........... 375/240.06, 375/240.12, 240.25
See application file for complete search history.

(56) References Cited

U.S. PATENT DOCUMENTS

| 5,343,247 | A | * | 8/1994 | Vogel | 375/240.16 |
| 5,757,434 | A | * | 5/1998 | Klein Gunnewiek et al. | 375/240.03 |
| 5,805,224 | A | * | 9/1998 | Keesman et al. | 375/240.04 |
| 6,961,376 | B1 | * | 11/2005 | Wu et al. | 375/240.12 |
| 2002/0080877 | A1 | * | 6/2002 | Lu et al. | 375/240.06 |
| 2002/0110193 | A1 | * | 8/2002 | Yoo et al. | 375/240.02 |

OTHER PUBLICATIONS

"A frame-based MPEG characteristics extraction tool and its application in video transcoding" Kan-Li Huang; Yi-Shin Tung; Ja-Ling Wu; Po-Kang Hsiao; Hsien-Shuo Chen; Consumer Electronics, IEEE Transactions on vol. 48, Issue 3, Aug. 2002 pp. 522-532.*

* cited by examiner

*Primary Examiner*—Gims Philippe
*Assistant Examiner*—Erick Rekstad
(74) *Attorney, Agent, or Firm*—Smith-Hill and Bedell

(57) ABSTRACT

A method of rate control using a picture-based lookahead sliding window in a dual-pass transcoder/encoder compressed video architecture extracts statistics from an input video signal according to a simple compression standard, the input video signal being a compressed video signal for transcoding or an uncompressed video signal for encoding. A trans-factor is calculated for a current picture based on previous pictures in a sliding window to predict the complexity of the current picture, the trans-factor being a ratio of global complexity measures for the simple compression standard versus a sophisticated compression standard. Bits for the current picture are then allocated based on the complexity of future pictures in the sliding window. After encoding the current picture according to the sophisticated compression standard, the target bits of and the picture complexity in the sliding window, as well as the trans-factor, are updated as the window is moved by one picture. The extraction of the statistics is achieved in a transcoder by using a simple compression standard decoder to produce the statistics from the compressed video signal as the input video signal, and in an encoder by using a simple compression encoder to generate the statistics from the uncompressed video signal as the input video signal.

10 Claims, 2 Drawing Sheets

RATE CONTROL WITH PICTURE-BASED LOOKAHEAD WINDOW

BACKGROUND OF THE INVENTION

The present invention relates to compression coding of video signals, and more particularly to rate control with a picture-based lookahead window for dual-pass compression encoding/transcoding.

There are many international standards for digital video compression technologies, such as H.261, MPEG1, MPEG2 (H.262), H.263, H.263+, MPEG4 and H.264 (MPEG4 part 10), that have emerged one after another during the 1990s. Generally algorithms recommended by newer standards are better, but also are usually more complicated to implement. It is easy to find examples of trading algorithm complexity for efficiency. With the fast growth in computation speeds of central processing units (CPUs) and digital signal processing (DSP) chips, implementation of more and more sophisticated algorithms has become practically feasible. It is a trend that video encoders/decoders (codecs) built based on newer standards eventually replace those built based on older standards in applications where specifications overlap, such as for bit-rate, resolution, etc. This replacement procedure takes a long period of time, since it is expensive to replace older video codecs with newer ones. Another reason older codecs continue to be used is that many video streams have already been compressed with the older algorithms, and may easily be decompressed by the older codecs. However where high coding efficiency is desired, there arises the mixed use of both older and newer codecs. In some applications it is desirable to re-transmit video streams compressed with an older codec at a new bit-rate that is lower than the older codec can achieve for the same video quality. Therefore to obtain higher compression efficiency a transcoder having mixed codecs—an older decoder and a newer encoder—is used. A good example is a transcoder that converts MPEG2 compressed video streams to H.264 compressed video streams.

It is recognized by the digital compression industry that dual-pass encoding with a lookahead window provides higher coding efficiency than single-pass encoding. But the cost of dual-pass encoding is much higher than single-pass encoding. The implementation cost is a serious problem for the emerging, more sophisticated, compression technologies, even for single-pass encoding. Using two sophisticated codecs for encoding/transcoding in a dual-pass architecture raises the cost of the encoder/transcoder by almost an order of magnitude over the older technology codecs.

What is desired is the achievement of higher coding efficiency in an encoder/transcoder architecture using mixed codecs for minimal cost.

BRIEF SUMMARY OF THE INVENTION

Accordingly the present invention provides rate control with a picture-based lookahead window for encoders/transcoders having mixed codecs in a dual-pass compressed video architecture. Statistics are extracted from an input video signal according to a simple compression standard, the input video signal being a compressed video signal for transcoding or an uncompressed video signal for encoding. A trans-factor is calculated for a current picture based on previous pictures in a sliding "past" window to predict the complexity of the current picture, the trans-factor being a ratio of global complexity measures for the simple compression standard versus a sophisticated compression standard. Bits for the current picture are then allocated based on the complexity of future pictures in the lookahead or "future" window. If future pictures are difficult to encode, then less bits are allocated to the current picture, and vice versa. This is effective for a scene change. Because the lookahead window takes into account the statistics of future pictures, i.e., pictures that have not yet been compressed according to the sophisticated compression standard, a more reasonable bit allocation and better quality is achieved. After encoding the current picture according to the sophisticated compression standard, the actual bits, the picture complexity and the trans-factor for the encoded picture are updated as the past and lookahead windows are shifted by one picture, i.e., the encoded picture moves into the past window and out of the lookahead window as a new picture is loaded into the lookahead window. The extraction of the statistics is achieved in a transcoder by using a simple compression decoder to produce the statistics from the compressed video signal where the compressed video signal is the input video signal, and in an encoder by using a simple compression encoder to generate the statistics from the uncompressed video signal where the uncompressed video signal is the input video signal.

The objects, advantages and other novel features of the present invention are apparent from the following detailed description when read in conjunction with the appended claims and attached drawing.

DETAILED DESCRIPTION OF THE INVENTION

Figure 1:
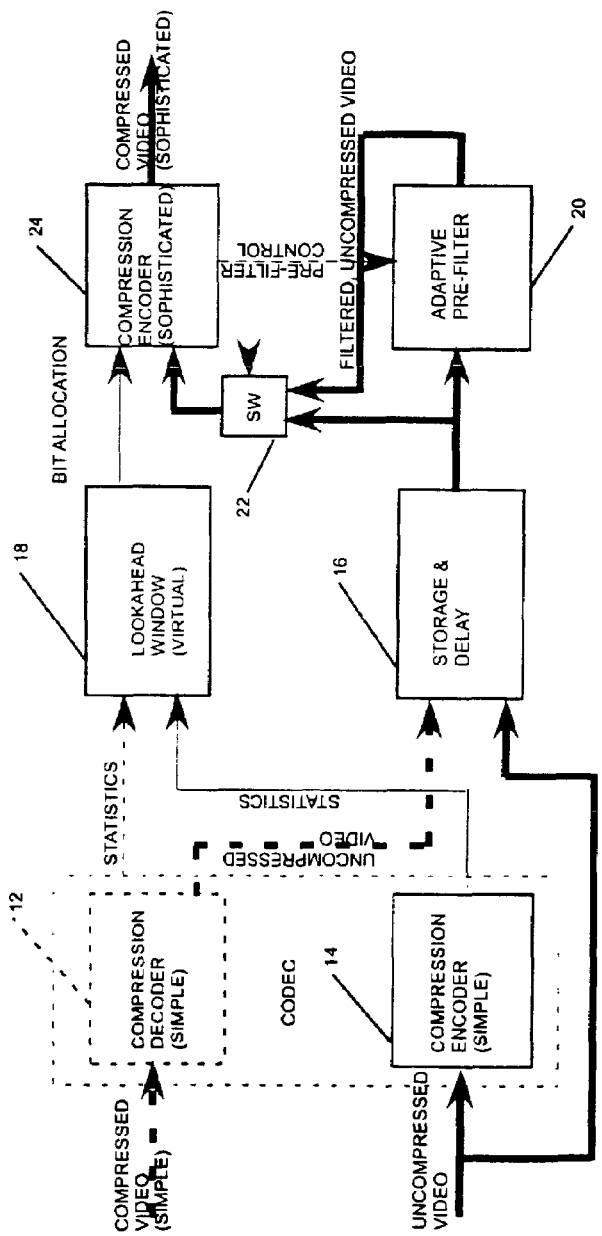
FIG. 1 is a block diagram view of a dual-pass encoder/transcoder architecture implementing rate control with a picture-based lookahead window according to the present invention.

Referring now to FIG. 1 an encoder/transcoder architecture is shown having a simple compression decoder 12 for receiving and decoding a compressed video stream encoded according to a simple compression standard, such as MPEG2, to produce an uncompressed video signal and related statistics. Alternatively a simple compression encoder 14 receives an uncompressed video stream to generate related statistics. The uncompressed video signal in either configuration (transcoder or encoder) is input to a storage and delay module 16, while the statistics are input to a lookahead window module 18 for processing by a rate control algorithm, described below. The lookahead window is a virtual concept that contains the statistics for each picture in the storage and delay module 16, for example, the number of bits for the picture, the picture type and the average quantization step size over all the macro-blocks for the picture. The uncompressed video stream from the storage and delay module 16 may be input to an optional adaptive pre-filter 20 to produce a filtered uncompressed video stream. A delayed uncompressed video stream from the storage and delay module 16 may be input to a switch 22 together with the filtered, uncompressed video stream, the delay compensating for the time required for the lookahead window module 18 to generate bit allocation data. The lookahead window module 18 generates the bit allocation data from the statistics for use by a sophisticated compression encoder 24, such as an H.264 encoder, in determining rate control for the sophisticated encoding process. The selected uncompressed video stream from the switch 22 and the bit allocation data are input to the sophisticated compression encoder 24 to produce a compressed video stream according to a sophisticated compressed video standard, such as H.264 (MPEG4, Part 10). The sophisticated compression encoder 24 also provides a control signal to the adaptive pre-filter 16 and to the switch 22 that determines, on the basis of the rate control and a status of its virtual buffer, the "strength" of the filtering and which uncompressed video stream is to be encoded. The strength of the filtering may be implemented as different filtering levels or may be continuous, and serves to "blur" the uncompressed video stream so that it is easier to compress, i.e., is less complex and so requires fewer bits to compress. The adaptive pre-filter 20 may be switched off or set to a low strength for minimum filtering when the filtered uncompressed video stream is not selected for encoding by the sophisticated compression encoder 24.

By using a simple encoder/decoder 12/14 instead of a sophisticated encoder/decoder at the input, the implementation cost is reduced close to that of a single-pass sophisticated codec. However the information on complexity estimation for pictures in the lookahead window module 18 is not exactly the desired information for the sophisticated compression encoder 24. For example, a P-type picture needs high bit-rate for motion compensation in simple (MPEG2) compression encoding if its corresponding original picture was recorded during light off/on/off transition time. On the other hand this P-type picture may be a simple picture for the sophisticated (H.264) encoder. In general the sophisticated encoder 24 has a much higher coding efficiency due to higher precision of motion prediction, DC and AC predictions, and better coding methods. The complexity estimation based on the simple compression standard cannot be proportionately scaled down to obtain accurate complexity estimation for the sophisticated compression standard. Despite this deficiency the correlation of picture complexity estimation based on both the simple and sophisticated compression standards is still strong. In most cases a picture or a group of pictures (GOP) that is relatively complicated/simple for the simple compression standard is also relatively complicated/simple for the sophisticated compression encoder 24. The complexity statistics still indicate important relative relationships among pictures and macro-blocks (MBs), with the error being tolerable. Therefore compared to single-pass sophisticated coding, the pseudo dual-pass sophisticated coding is superior in video coding efficiency with only a slightly higher implementation cost.

The statistics of picture complexity are used for:
estimation of a bit-rate target and selection of quantizer step sizes of macro-blocks for a current picture before second pass encoding; and
control of the strength of the adaptive pre-filter 20 for a current GOP which includes the current picture before second pass encoding.

To convert simple coding complexity to sophisticated coding complexity, a "trans-factor" is introduced for I, P, B pictures respectively. A picture-based sliding window within the lookahead window module 18 is used to allocate bits for the current picture by taking into account the statistics for future pictures. The described architecture is essentially a simple/sophisticated "transrater". A detailed description of the rate algorithm for such a transrater follows, the algorithm being general purpose such that it may be used in transcoding between other different standards, different bit-rates, different image resolutions and different picture rates.

The storage and delay module 16 stores multiple decoded images—the larger the lookahead window size the better the video quality performance of the encoder/transcoder. The limitation is the size of the memory and an allowed maximum delay. A storage length of at least one GOP of the input video signal is desired. The lookahead window module 18 sets a bit-rate target for the current picture being encoded based on the received statistics, which include picture types, picture bytes, and average quantizer step sizes at picture levels, as indicated above. A complicated picture deserves more bits to encode than a simple picture, just as an I picture usually requires more bits than a P picture and a P picture usually requires more bits than a B picture.

The picture complexity in the sense of encoding is not the same for the two different compression standards. In fact the coding efficiency of the sophisticated compression encoder 24, being the newer codec, is generally much higher than the older codec due to higher precision motion search, multi-mode motion prediction, space-domain intra prediction, smaller block size encoding, integer transform and use of multiple reference frames, for example. As mentioned a P-type picture may be complicated and needs high bit-rate for motion compensation in MPEG2 encoding if its corresponding original picture was recorded during flash light off/on/off transition time. On the other hand this P-type picture may be a simple picture to an H.264 encoder which is able to select one out of up to five reference frames for motion prediction, the maximum number of reference frames being level independent, and one out of the references may be strongly correlated with this P-type picture, as indicated above.

In addition to setting the bit-rate target, the statistics of picture complexity obtained by the lookahead window module 18 may also be used for generating the control signal for the adaptive pre-filter 20 to control the "strength" of the low-pass filtering. If the rate control information based on the statistics indicate that the current picture is a difficult picture which needs more bit-rate to encode, the strength of the adaptive pre-filter 20 may be set strong so that this picture is heavily low-pass filtered, i.e., becomes softer and easier to encode. The sophisticated compression encoder 24 selects input either from the delayed uncompressed video signal output from the storage and delay module 16 or from the filtered video signal output by the adaptive pre-filter 20—the choice is based on the rate control information generated from the bit allocation data provided by the lookahead window module 18 and on the virtual buffer fullness of the sophisticated compression encoder 24. For example, if the rate information indicates that the current picture for encoding requires more bits and that the virtual buffer is approaching full, then the amount of pre-filtering is adjusted so that the virtual buffer does not overflow and the filtered uncompressed video is the video signal that is encoded. If there is no danger of virtual buffer overflow, then the current picture is slightly filtered or not filtered at all (the uncompressed video signal from the storage and delay module 16 is used as the input for encoding). However, frequently and abruptly changing the filter strength and/or switching between the uncompressed video signal and the filtered uncompressed video signal with a GOP may lead to incrementing of a motion compensating residue signal for P and B pictures. This is avoided by smoothly controlling the pre-filter 20 within a GOP.

The rate control algorithm used, by way of illustration, is based on the Test Model 5 (TM5) specification. TM5 takes a complexity measure to allocate target bits for each picture and then sets a quantization parameter for each MB based on the fullness of the virtual buffer. In the trancoder configuration all of the information about the input video signal is available from the encoded compressed video stream via the decoder 12, especially the statistics about the complexity of the input content. In the encoder configuration all the information about the input video signal is available from the uncompressed video stream via the simple encoder 14, especially the statistics about the complexity of the input content. The rate control algorithm includes two parts:
1. Take "past" statistics for complexity prediction.
2. Take "future" statistics for bit allocation.

Both processes are adaptive and a "sliding window" is maintained to update the statistics after each picture is encoded. Contrary to prior applications that used sliding windows which increment in terms of GOPs, the sliding window of the present invention is picture-based, and moves forward after encoding each picture.

The rate algorithm therefore has four steps: (a) statistics extraction; (b) complexity prediction; (c) bit allocation; and (d) statistics update.

(a) Statistics Extraction

When transcoding from an MPEG2 variable bit-rate (VBR) stream to an H.264 constant bit-rate (CBR) stream or encoding an uncompressed video stream to an H.264 CBR stream the following information is collected:
1. Average quantization parameters (quantization step size) for each picture.
2. Output bits for each picture.
3. Picture type (I, P, B) for each picture.

Items 1 and 2 are used for calculation of the input video's complexity, while item 3 records the picture type that the sophisticated compression encoder 24 follows.

(b) Complexity Prediction

Complexity prediction is to predict the complexity of a current picture from a prior simple/sophisticated (MPEG2/H.264) complexity ratio and the input complexity of the current picture. In TM5 the current picture's complexity is predicted by that of the previous picture with the same type. However since the statistics are based on a simple encoding format an adjustment, referenced here as "trans-factor", is introduced to take into account the difference between the sophistication of the two standards and/or the two bit-rates. Trans-factor is calculated by a previous simple/sophisticated ratio and updated after encoding each picture. Because of the different properties of different picture types, trans-factor is calculated independently for each picture type.

The complexity prediction algorithm has two steps:

1. Calculate a current "trans-factor" for a current picture by averaging previous trans-factors At the beginning of a video sequence to be encoded/transcoded there are three initial values for the trans-factors of each picture type (I, P, B). The average trans-factor over a "past" sliding window is generally better than that of only one picture and takes into account all of the pictures already encoded by the sophisticated encoder 24 that are within the past window.

$$T_{Icur}=(1/W_I)\Sigma_{j=i-WI+1->i}T_I(j)$$

$$T_{Pcur}=(1/W_P)\Sigma_{j=i-WP+1->i}T_P(j)$$

$$T_{Bcur}=(1/W_B)\Sigma_{j=i-WB+1->i}T_B(j)$$

where "i" is the picture number of the current picture and $W_I$, $W_P$ and $W_B$ are window sizes for the I, P, B pictures. $W_I$, $W_P$ and $W_B$ (number of I, P and B pictures in a set of pictures within the storage and delay module 16) may be selected as:

$$W_I=2 \text{ or } 3$$

$$W_P=(N_P/N_I)W_I$$

$$W_B=(N_B/N_I)W_I$$

Therefore $W_I$ defines the number of GOPs (1+ or 2+ GOPS in this example) within the set of pictures from which the reference pictures (I) come. For a GOP structure with parameters M (distance between I and P), N (intra period), $N_I$, $N_P$ and $N_B$ may be calculated as:

$$N_I=1$$

$$N_P=(N/M)-N_I$$

$$N_B=(N-N_P-N_I)$$

For example for a GOP with M=3, N=15, then $N_I=1$, $N_P=4$ and $N_B=10$. For a variable GOP, $W_P$ and $W_B$ follow the number of P and B pictures in the corresponding GOP.

2. Predict current picture's complexity $$X_{I4}=X_{I2}/T_{Icur}$$

$$X_{P4}=X_{P2}/(T_{Pcur}*K_{P4})$$

$$X_{B4}=X_{B2}/(T_{Bcur}*K_{B4})$$

where $K_{P4}$ and $K_{B4}$ are universal constants for P and B pictures, i.e., are weight factors in considering that different picture types have different quality requirements. I and P pictures are more important than B pictures for they are used as references to do temporal prediction. In TM5 $K_{P2}$ and $K_{B2}$ are set as $K_{P2}=1.0$, $K_{B2}=1.4$ for all sequences. But for different sequences $K_{P4}$ and $K_{B4}$ are set differently to achieve a relatively constant quality for I, P and B pictures. For a well-predicted sequence $K_{P4}$ and $K_{B4}$ are set larger. For a fast motion sequence $K_{P4}$ and $K_{B4}$ are set smaller. An empirically determined value for $K_{B4}$ is given by the complexity ratio of I over B:$X_I/X_B$ (the relatively simple MPEG2 complexity ratio is good enough for this purpose). It is not necessary to touch $K_{P4}$, still set equal to 1.0, since the PSNR for B pictures fluctuates more than for P pictures. $K_{B4}$ is set adaptively after encoding each GOP by $X_I/X_B$ where $X_B$ is the average complexity of all B pictures in the current GOP.

TABLE 1

Empirically Determined Values for $K_{B4}$

| $X_I/X_B$ | $K_{B4}$ |
|---|---|
| >5.0 | 1.35 |
| 2.0–5.0 | 1.2 |
| <2.0 | 1.1 |

(c) Bit Allocation

Bit allocation is to adjust target bits for a current picture based on the complexity of future pictures. If future pictures are difficult to encode, then less bits should be allocated to the current picture, and vice versa. This is particularly effective for scene changes in the video signal. Bit allocation may be based on GOP-layer and picture-layer. Picture-layer breaks the GOP boundary and performs better than GOP-layer. Again bit allocation has two steps.

1. Allocate target bits for current picture

Calculate the target bits $T_W$ for a lookahead sliding window.

$$T_W = W_F * (R/F)$$

where $W_F$ is the window size of the lookahead window, which may be set by a user, R is a target bit rate and F is the picture rate. Then allocate target bits, B, for the current picture by the complexity ratio of the picture related to the lookahead window.

$$B = ((X_4[\text{current\_Picture\_SN}])/(\Sigma_{i=0 \to (W_f-1)} X_4[\text{current\_Picture\_SN}+i])) * T_W$$

where current_Picture_SN is the current picture's serial number.

In bit allocation the target output picture bits may not be larger than the input picture bits, so the target bits in this eventuality are clamped to the input picture bits.

$$T_W + = B - \text{Bits\_MPEG2}[\text{current\_Picture\_SN}],$$

$$B = \text{Bits\_MPEG2}[\text{current\_Picture\_SN}]$$

The extra bits are only allocated to the current sliding window so that after encoding W pictures $T_W$ subtracts the extra bits.

2. Adaptive quantization and encoding (TM5)

Before encoding $MB_j$ the fullness of the virtual buffer is computed for I, P, B independently:

$$d_j = d_0 + B_{j-1} - (T*(j-1))/MB\_cnt$$

where $B_j$ is the number of bits generated by encoding all MBs in the picture up to and including j, MB_cnt is the number of MBs in the picture, T is the constant bit rate (CBR) per picture, $d_0$ is the initial fullness of the virtual buffer and $d_j$ is the fullness of the virtual buffer at $MB_j$. The reference quantization parameter $Q_j$ is then computed for $MB_j$ $$Q_j = d_j * 51/r$$

where the reaction parameter, r, is $$r = 2 * R/F$$

Adaptive quantization:

The spatial activity for $MB_j$ from four luminance picture-organized sub-blocks (n=1 . . . 4) and four luminance field-organized sub-blocks (n=5 . . . 8) are computed using the original pixel values $$act_j = 1 + \min(vblk_1, vblk_2, \ldots, vblk_8)$$

where $$vblk_n = (1/64) * \Sigma_{k=1 \to 64} (P_k^n - P\_mean_n)^2$$

and $$P\_mean_n = (1/64) * \Sigma_{k=1 \to 64} P_k^n$$

where P is the pixel gray level.

Then normalize $act_j$:

$$N\_act_j = ((2*act_j) + avg\_act)/(act_j + (2*act\_act))$$

where avg_act is the average value of $act_j$ for the last picture to be encoded.

Then adjust $mquant_j$ as:

$$mquant_j = Q_j * N\_act_j$$

The final value of $mquant_j$ is clipped to a range [1 . . . 51] and used for the quantization. Delta QP should be clipped to [−26,26], as defined by H.264 semantics. Then encode one MB with $mquant_i$ and repeat this step until all MBs of the current picture are encoded.

(d). Update Picture Complexity and Trans-Factor for Just Encoded Picture

1. Trans-factor is defined as the ratio of "global complexity measure" of corresponding simple and sophisticated compression standards pictures.

$$T_I[\text{current\_picture\_SN}] = X_{I2}/X_{I4}$$

$$T_P[\text{current\_picture\_SN}] = X_{P2}/X_{P4}$$

$$T_B[\text{current\_picture\_SN}] = X_{B2}/X_{B4}$$

where $X_{I2}$. $X_{P2}$ and $X_{B2}$ represent the complexity measure for I, P, B pictures of the simple compression standard (MPEG2) stream and may be calculated as:

$$X_{I2} = S_{I2} Q_{I2}$$

$$X_{P2} = S_{P2} Q_{P2}$$

$$X_{B2} = S_{B2} Q_{B2}$$

where $S_{I2}$, $S_{P2}$ and $S_{B2}$ are the number of bits for each picture and $Q_{I2}$, $Q_{P2}$ and $Q_{B2}$ are the average quantization parameters for all MBs in each picture. $X_{I4}$, $X_{P4}$ and $X_{B4}$ represent the complexity measure for the I, P, B picture of the output, sophisticated compression standard (H.264) stream:

$$X_{I4} = S_{I4} Q_{I4}$$

$$X_{P4} = S_{P4} Q_{P4}$$

$$X_{B4} = S_{B4} Q_{B4}$$

2. Because the allocated target bits can't match the average target bit-rate (the sum of complexity ratio can't be one when applying the sliding window) and actually produced bits can't match allocated bits, a rate adjustment is done after encoding each picture. The mismatched bits are calculated with the original target bits and added to the target bits of the window. Therefore the overall average bit-rate still matches the target bit-rate, not considering buffer overflow or underflow.

$$T_W = T_W + R/F - S$$

where S are the actual bits of the encoded picture. If the input sequence is not infinitely long, at the end of the sequence lookahead window size $W_F$ and $T_W$ both decrease. After encoding each picture the trans-factor, $T_I$, $T_P$ or $T_B$, is updated and all the predicted complexity in the future sliding window is updated as well.

Figure 3:
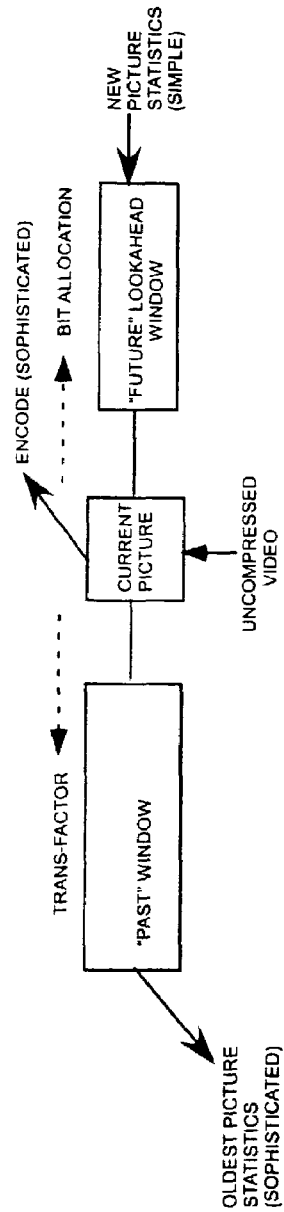
FIG. 3 is a conceptual view of virtual sliding windows according to the present invention.
Figure 2:
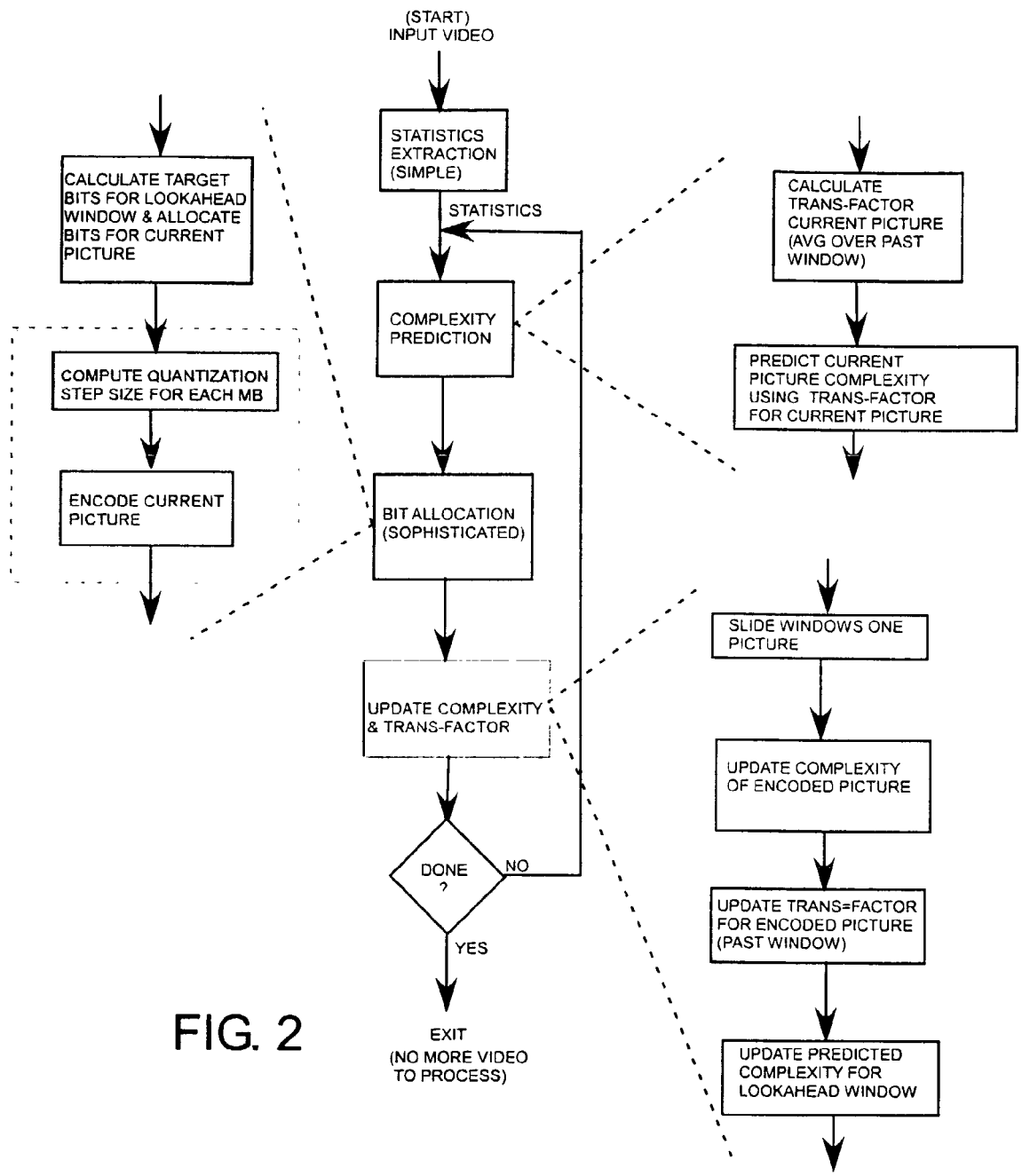
FIG. 2 is a flow chart view of a rate control algorithm according to the present invention.

As illustrated in FIG. 3 the trans-factor to be used in determining the complexity for the current picture to encode is based upon the average of the trans-factors for the same picture type in the "past" window, while the bit allocation for the current picture is based on the overall complexity of the pictures in the lookahead window. After each picture is encoded, then the actual sophisticated standard complexity is determined and entered in the "past" window while the oldest one is shifted out. A new picture statistics is loaded into the lookahead window to determine a new complexity for the window as the next picture to be encoded becomes the current picture.

Thus the present invention provides rate control with a picture-based sliding window to simplify transcoding/encoding from a simple compression standard to a sophisticated compression standard by extracting statistics for a video signal using the simple compression standard, by using the extracted statistics and virtual buffer fullness to control a lowpass pre-filter for the uncompressed video signal, and by encoding the filtered or unfiltered uncompressed video signal using a trans-factor which is the ratio of global complexity measures for the simple and sophisticated compression generated standards pictures with a sliding window on a picture-by-picture basis, updating the trans-factor and sliding window for each picture.

What is claimed is:

1. A method of rate control with a picture-based lookahead window using statistics from an input video signal determined by a simple compression standard for encoding the video signal using a sophisticated compression standard comprising the steps of:
   extracting from the input video signal the statistics for each picture within the picture-based lookahead sliding window based on the simple compression standard;
   predicting a complexity for a first picture within the picture-based lookahead sliding window as a current picture, using a trans-factor based upon the current and previous pictures; and
   allocating bits for encoding the current picture according to the sophisticated compression standard based on the statistics and target bits for the pictures within the picture-based lookahead sliding window.

2. The method as recited in claim 1 wherein the input video signal comprises a compressed video signal in the simple compression standard and the extracting step comprises the steps of:
   decoding the compressed video signal according to the simple compression standard to generate an uncompressed video signal and the statistics; and
   separating the statistics from the uncompressed video signal for input to the predicting step, the encoded video signal being a transcoded version of the compressed video signal.

3. The method as recited in claim 1 wherein the input video signal comprises an uncompressed video signal and the extracting step comprises the step of encoding the uncompressed video signal to obtain the statistics for input to the predicting step, the encoded video signal being an encoded version of the uncompressed video signal.

4. The method as recited in claim 1 further comprising the steps of:
   updating the target bits and complexity in the picture-based lookahead sliding window after encoding the current picture and moving the picture-based lookahead sliding window by one picture; and
   repeating the extracting, predicting and allocating steps for a next picture as the first picture of the picture-based lookahead sliding window.

5. The method as recited in claim 1 wherein the predicting step further comprises the step of empirically determining a universal constant as a function of a complexity ratio between two types of compressed pictures within the set of pictures, the universal constant being used to predict the complexity for the first picture.

6. A pseudo dual-pass video compression architecture comprising:
   means for extracting from an input video signal statistics for a set of pictures according to a simple compression standard;
   means for storing the set of pictures in an uncompressed video format;
   means for analyzing the statistics for the set of pictures to produce rate control information using a trans-factor and a picture-based sliding window; and
   means for encoding the set of pictures from the storing means as a function of the rate control information according to a sophisticated compression standard to produce an output compressed video signal.

7. The architecture as recited in claim 6 further comprising:
   means for adaptive pre-filtering the set of pictures from the storing means as a function of the rate control information and a virtual buffer fullness status for the encoding means; and
   means for selecting as input to the encoding means one of the set of pictures from the storing means and the set of pictures from the adaptive pre-filtering means.

8. The architecture as recited in claims 6 or 7 wherein the input video signal comprises a compressed video signal encoded according to the simple compression standard and the extracting means comprises means for decoding the compressed video signal to produce the statistics and the set of pictures in the uncompressed video format whereby the compressed video signal is transcoded into the output compressed video signal.

9. The architecture as recited in claims 6 or 7 wherein the input video signal comprises a video signal in the uncompressed video format and the extracting means comprises means for encoding the video signal according to the simple compression standard to produce the statistics.

10. The architecture as recited in claim 6 wherein the analyzing means comprises means for updating the trans-factor and picture-based sliding window after each picture in the set of pictures is encoded by the encoding means.

* * * * *